(12) United States Patent
Jacobs

(10) Patent No.: US 6,681,221 B1
(45) Date of Patent: Jan. 20, 2004

(54) METHOD AND SYSTEM FOR ACHIEVING DIRECTED ACYCLIC GRAPH (DAG) REPRESENTATIONS OF DATA IN XML

(75) Inventor: Ronald Michael Jacobs, San Jose, CA (US)

(73) Assignee: Docent, Inc., Mountain View, CA (US)

( * ) Notice: Subject to any disclaimer, the term of this patent is extended or adjusted under 35 U.S.C. 154(b) by 315 days.

(21) Appl. No.: 09/691,966

(22) Filed: Oct. 18, 2000

(51) Int. Cl.[7] .............................................. G06F 17/30
(52) U.S. Cl. .......................................... 707/5; 707/514
(58) Field of Search ............................... 707/1, 2, 3, 4, 707/5, 10, 513; 711/133

(56) References Cited

U.S. PATENT DOCUMENTS 6,263,332 B1 * 7/2001 Nasr et al. ...................... 707/5
6,347,307 B1 * 2/2002 Sandhu et al. ............... 707/513
6,366,934 B1 * 4/2002 Cheng et al. ................ 711/133
6,457,103 B1 * 9/2002 Challenger et al. ......... 711/133

OTHER PUBLICATIONS

Shanmugasundaram et al. ("Relational Databases for Querying XML Documents: Limitations and Opportunities").*
Rafael Berlanga, Maria Jose Aramburu and Salvador Garcia "Efficient Retrieval of Structured Documents From Object–Relational Databases").*
Masatoshi Yoshikawa Hiroyuki Kato and Hiroko Kinutani ("Design Framework of a Database for Structured Documents with object links") 1998.*

* cited by examiner

Primary Examiner—Diane D. Mizrahi
Assistant Examiner—Yicun Wu
(74) Attorney, Agent, or Firm—Sawyer Law Group LLC

(57) ABSTRACT

Method and system aspects for achieving directed acyclic graph (DAG) representations of data in XML are described. The aspects include augmenting a document type definition (DTD) for allowing description of the DAG in an XML file and for providing functionality for a document object model application program interface (DOM API) to process the XML file.

12 Claims, 7 Drawing Sheets

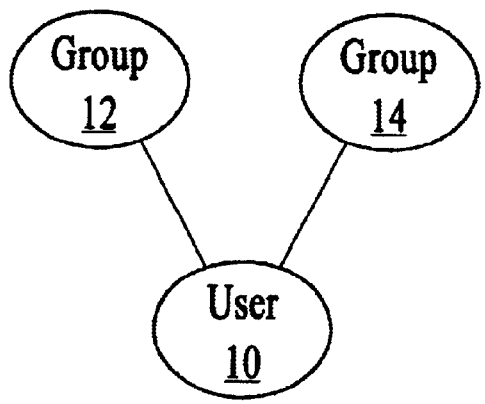
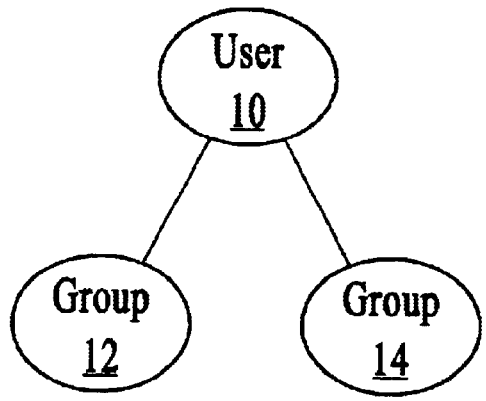
FIG. 1A
FIG. 1B
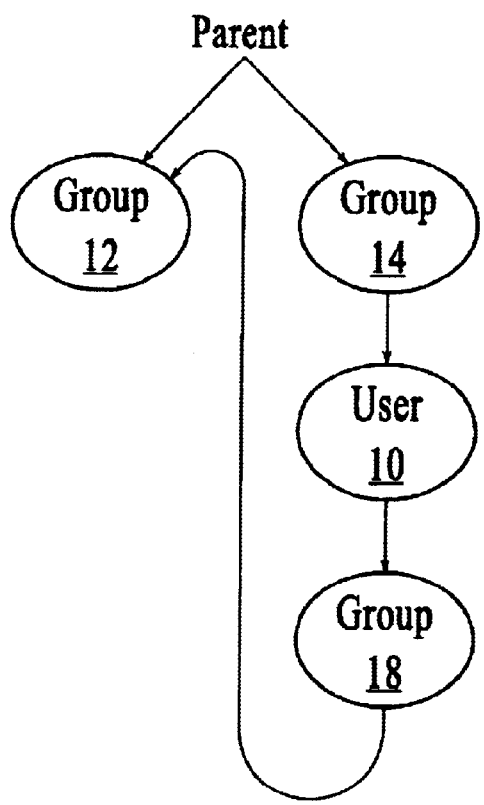
FIG. 2

```
<?xml version="1.0" encoding="UTF-8"?>
<!DOCTYPE Site-Repository PUBLIC "-//g-Force Systems//DTD Macbeth Site Repository 2.5//EN" "http://www.gforce.com/XML/DTD/Macbeth/2.5/site.repository.dtd">
<Site-Repository version="2.5">
  <Site-Content>
    <Group id="group-some-authors">
      <Title>Some Authors</Title>
      <Authorized-Role>Publisher</Authorized-Role>
    </Group>
    <Group>
      <Title>Bunch of Creative People</Title>
      <Authorized-Role>Publisher</Authorized-Role>
      <User>
        <First-Name>John</First-Name>
        <Last-Name>Doe</Last-Name>
        <Email-Address>jdoe@somewhere.com</Email-Address>
        <Login-Name>macbeth</Login-Name>
        <Login-Password encrypted="yes">
        <!-- This is "macbethpw" !-->L8PZM+KuJuuD8z0cOrEAyA==</Login-Password>
        <Authorized-Role>Learner</Authorized-Role>
        <Group>
          <Link ref="group-some-authors"/>
        </Group>
      </User>
    </Group>
  </Site-Content>
</Site-Repository>
```

FIG. 3

```
/**
 * Returns whether an element is a reference to another element
 *
 * @param element An element that might be a reference to another element
 * @return <code>boolean</code> true if the element is a reference to another element
 * @see org.w3c-xxl.Element
 */
public final boolean isReference (final Element element)
{
    return getSoleChild (element, "Link") !=null;
}
```

FIG. 4B

```
/**
 * Returns the ID for a reference to another element
 *
 * @param element An element that might be a reference to another element
 * @return <code>String</code> containing the ID, or <code>null</code> if the element is not
         a reference to another element
 * @see org.w3c-xml.Element
 */
public final String getReferenceID (final Element element)
{
    String resultString = null;
    Element linkElement = getSoleChild (element, "Link");

if (linkElement !=null) {
        resultString = linkElement.getAttribute ("ref");
    }
    return resultString;
}
```

FIG. 5B

```
/**
 * Resolves an element which might be a reference to another element
 *
 * @param element An element that might be a reference to another element
 * @return the same <code>Element</code>, or if the element is a reference to another element,
 *         then that element
 * @see org.w3c.xxl.Element
 */
public final Element resolveReference (final Element element)
    throws Parser.Exception, IOException
{
    Parser parser = getParser();
    Element resultElement = element;
    Element linkElement = getSoleChild (element, "Link");

if (linkElement != null) {
        resultElement = (Element) parser.getElementByID (linkElement.getAttribute ("ref"));

if ( ! resultElement.getTagName (). equals (element.getTagName ())) {
            throw new IllegalArgumentException ("Element <" + element.getTagName () +
                "> is linked to an element <" + resultElement.getTagName () + "> (id \"" +
                linkElement.getAttribute ("ref") + "\")");
        }
    }
    return resultElement;
}
```

FIG. 6B

<!ELEMENT A1 (A2)>
<!ELEMENT A2 EMPTY>

<!ELEMENT A1 (A2 | Link)>
<!ATTLIST A1 id ID #IMPLIED>
<!ELEMENT A2 EMPTY>
<!ELEMENT Link EMPTY>
<!ATTLIST Link ref IDREF #REQUIRED>

METHOD AND SYSTEM FOR ACHIEVING DIRECTED ACYCLIC GRAPH (DAG) REPRESENTATIONS OF DATA IN XML

FIELD OF THE INVENTION

The present invention relates to XML, and more particularly to achieving directed acyclic graph (DAG) representations of data in XML.

BACKGROUND OF THE INVENTION

The omnipresence of the Internet in today's society has created an expectation that desired information be readily available, easily accessible, and user-friendly. Conformance with established practices allows website designers and developers to meet the needs of Internet users. In general, hypertext markup language (HTML) was designed to display data, and to focus on how data looks. In a similar manner, extensible markup language (XML), was designed to describe data, and to focus on what data is.

XML provides a way to structure, store and send information and achieves a cross-platform, software- and hardware-independent tool for transmitting information. XML uses a DTD (Document Type Definition) to describe the constraints and define the valid elements of an XML document. Currently, XML capably represents data of a hierarchical data structure ('tree structure'), i.e., data with a traditional direct parent-child relationship, where each child has a single parent. Thus, an XML document can be represented as a tree of elements. A simple example of a hierarchical organization of information similar to the tree nature of XML documents is a file system, where files and folders are organized hierarchically, such that a folder may have files in it or other folders, and everything is descended from one root folder. Each file can be viewed as a child of the folder parent from which it descends.

There is no specific support in XML for representing data having a graph structure, e.g., a directed acyclic graph (DAG), where a child has multiple direct parents. Without support for a DAG, there is also no enforcement of the semantics of a DAG. For example, in a given situation, complex relationships may need to be represented, such as when a user of a system is associated as a member of several groups. A problem could exist in the specification of this type of relationship with XML.

FIGS. 1a and 1b illustrate circle graph diagrams for representing the example relationship where a user is a member of multiple groups. As shown in FIG. 1a, a choice could be made to represent a user 10 as a child of multiple parents, group 12 and group 14. Unfortunately, as stated above, XML only supports representation of a relationship where a child descends from a single parent. Thus, in order to represent the user 10 and its relationship to the multiple groups 12 and 14 in XML, the user 10 could become the parent for the individual children of groups 12 and 14, as shown in the diagram of FIG. 1b. In order to represent the relationships in this way, the semantics must be modified from "users belong to groups" to "groups belong to users." This reorganization, in which a user must designate the groups to which it belongs, is not optimal. While this choice as shown in FIG. 1b maintains a parent-child relationship that can be represented in XML, a problem arises when attempting to include other users that could exist for the groups 12 or 14. Having already been specified as children of user 10, they cannot be represented as children of another user, nor can the other users be their children without also descending from user 10.

As demonstrated by this example, a problem exists in XML in not being fully able to provide a more human-oriented manner of specifying data that accommodates situations where a DAG representation rather than a tree representation is appropriate.

Accordingly, what is needed is a generalized method and system for representing a directed acyclic graph (DAG) in a hierarchical XML information set. The present invention addresses such a need.

SUMMARY OF THE INVENTION

The present invention provides method and system aspects for achieving directed acyclic graph (DAG) representations of data in XML. The aspects include augmenting a document type definition (DTD) for allowing description of the DAG in an XML file and for providing an API for processing the DAG transparently. The API is consistent with and interoperates with the standard document object model application program interface (DOM API) for processing the XML file.

According to the system and method disclosed herein, a more human-oriented way of specifying data relationships within the hierarchical structure of XML is achieved. The data specification allows an element to be specified initially with subsequent references linked to the initial specification. Further, the present invention provides the functions necessary to properly process the new data definitions in a seamless and straightforward manner.

BRIEF DESCRIPTION OF THE DRAWINGS

FIGS. 1a and 1b illustrate circle graph diagrams for representing an example relationship where a user is a member of multiple groups.

FIG. 2 illustrates a circle graph diagram of the example relationship that can be represented in XML in accordance with the present invention.

FIG. 3 illustrates an example XML file in accordance with a preferred embodiment of the present invention.

FIGS. 4b, 5b, and 6b illustrate JAVA code for the block flow diagrams of FIGS. 4a, 5a, and 6a, respectively.

DETAILED DESCRIPTION

Figure 4A:
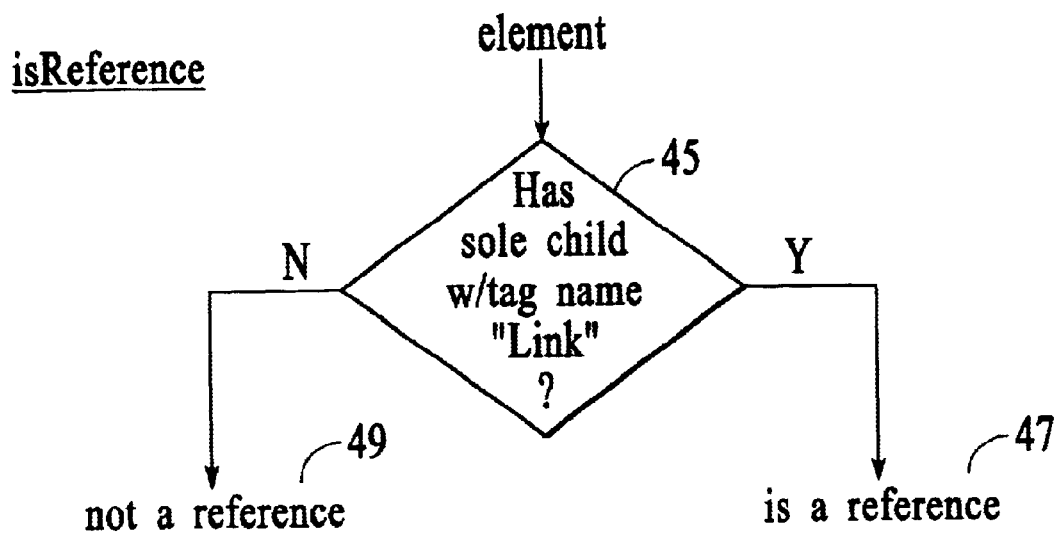
FIGS. 4a, 5a, and 6a illustrate block flow diagrams for functions that extend a DOM tree API in accordance with a preferred embodiment of the present invention.

The present invention relates to achieving directed acyclic graph (DAG) representations of data in XML. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Through the present invention, a situation, such as that described with reference to FIGS. 1a and 1b can be represented as a DAG relationship, such as shown in the circle diagram of FIG. 2. The present invention provides a technique for representing such a DAG in a hierarchical XML information set. Since XML only represents data of a hierarchical data structure ('tree structure'), i.e., data with a traditional direct parent-child relationship, where a child has a single parent, the present invention provides a technique that augments a DTD in a slight and repeatable manner and provides functionality to handle the representation of DAGs in XML. The augmentation of the DTD is provided by adding an element with a tag name called "Link" for utilization when defining elements to have multiple direct parents, as is further described more fully hereinbelow.

FIG. 3 illustrates an example of an XML file that includes a Link element in accordance with the present invention. Again using the user and multiple group 20 example, as shown in FIG. 3, the two group elements, 12 and 14, are defined. A first group 12 includes an attribute id with the value "group_some_authors", has a title element "Some Authors", and has an authorized role element as "Publisher". A second group 14 has a title element, "Bunch of Creative People", an authorized role element, Publisher, and a user element 10, and does not require an attribute ID. The user element 10 includes elements for first name, last name, email address, login name, login password, and authorized role. Further, another group element 18 containing a link element with a "ref" attribute of "group_some_authors" is specified. Thus,:the group element 12 is linked to the user element 10 through the use of group element 18 that contains the link element referring to the "id" attribute defined previously for the group element 12. In this manner, group element 18 acts as a reference element to a defining element, group element 12. In a preferred embodiment, a referencing element has a single child element with the "link" tag name, rather than repeating the attribute and/or child elements of a defining element. The relationship defined in FIG. 3 is represented as the DAG in FIG. 2. It should be appreciated that although only one referencing element (group element 18) is utilized in this example for a defining element (group element 12), in general, there can be more than one referencing element for a defining element, if needed.

The arrows of FIG. 2 further indicate the directed nature of the traversal that occurs in accordance with the present invention during processing of the XML file to support the link element, as is further described hereinbelow.

As is well understood in the art, an XML Parser converts the information in an XML document into a tree of elements after parsing the document. Thus, the parser reads the XML file and processes the file by checking the information contained in it for validity (by using a DTD if one is used) and expanding all the entities used in the file. Then this (processed) XML document is converted into a tree of objects in memory called a DOM tree by the XML parser. This document object contains a tree of elements that contain the data and structure of the information contained in the XML document. The XML Document Object Model (DOM) is a programming interface for XML documents and allows access to this tree of elements using interfaces defined in the DOM API. The objective for the XML DOM has been to provide a standard programming interface to a wide variety of applications, and thus, the XML DOM is designed to be used with any programming language and any operating system. Accordingly, once a document object tree has been created (e.g., by the XML parser), elements can be accessed in that tree, and leaves and branches can be modified, deleted and created by using the interfaces in the API.

In accordance with the present invention, the standard DOM tree API is augmented with new functions so that an element with multiple direct parents is accessed in several places identically without having to distinguish defining elements from referencing elements. Through the augmentation of the API with the functionality presented in the following, the application software processing the DOM tree does not have to do any additional processing in support of the DAG and the DAG characteristic of the data remains transparent.

Figure 5A:
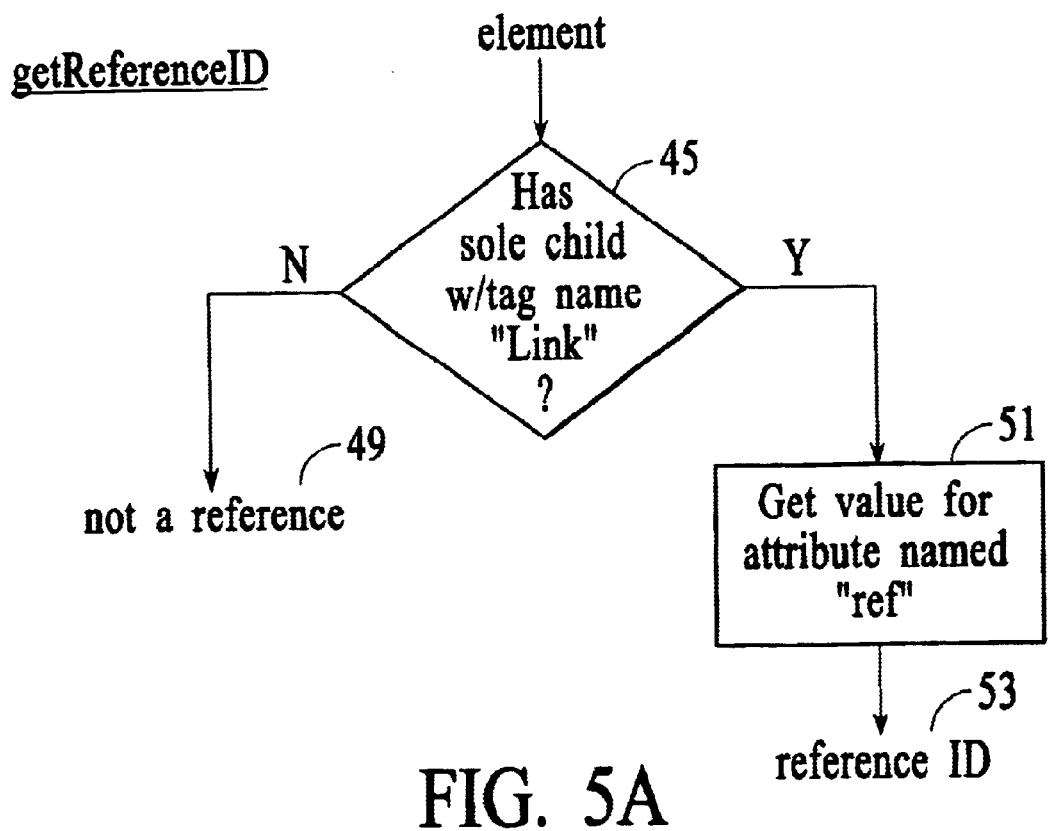
Figure 6A:
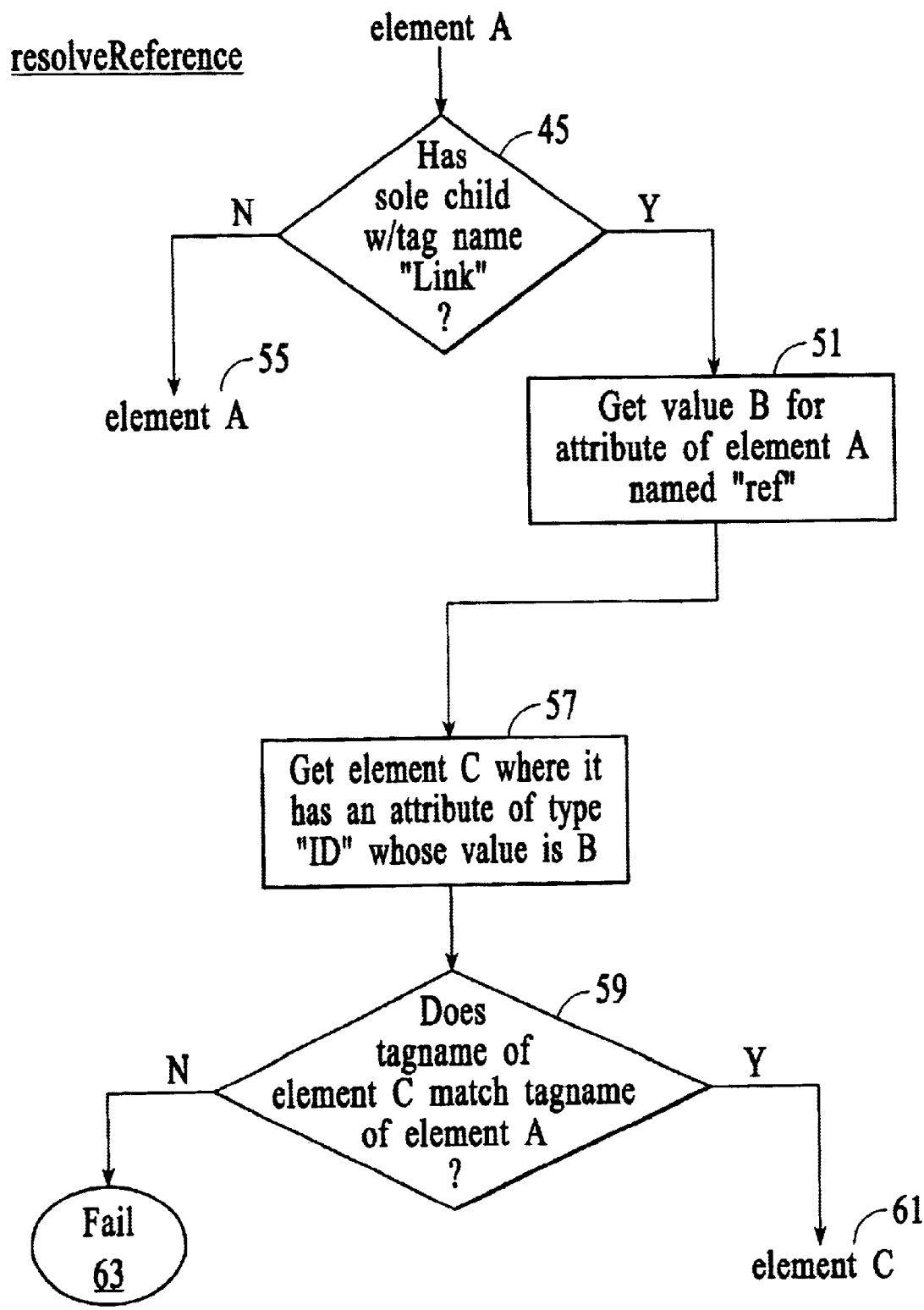

FIGS. 4a, 5a, and 6a illustrate block flow diagrams that extend the DOM tree API in accordance with the present invention. The description of the flow diagrams is presented with reference to the code shown in FIGS. 4b, 5b, and 6b. It should be appreciated that FIGS. 4b, 5b, and 6b illustrate JAVA code for a preferred embodiment. Of course, if desired, other implementations of the functionality represented by the flow diagrams of FIGS. 4a, 5b, and 5c may be used. Further, all data types shown in FIGS. 4b, 5b, and 6b are built into JAVA or part of the DOM API, as is well appreciated by those skilled in the art. Of course, the names given to the variables in the code presented are user-dependent.

A first function determines whether an element is a reference to another element, i.e., whether an element is a referencing element. Referring to FIG. 4a, to achieve the first function, it is determined whether an element has a sole child with a tag name of "Link" (step 45). If yes, an indication that the element is a reference is returned (step 47). If no, an indication that the element is not a reference is returned (step 49). Referring to the code 44 of FIG. 4b, getSoleChild is implemented for the first function to return, for a given element, the sole child of that element with the name specified, i.e., the name "Link". Code 44 returns null if there are zero (or multiple) children with that name for the given element (i.e., if there is no link element), and returns non-null if there is a child with that name (i.e., if there is a link element).

A second function extends the first function by not only determining whether an element is a reference to another element, but also retrieving the attribute id for a reference to another element. Referring to FIG. 5a, when the element is determined to have a sole child with the name "Link" (step 45 is affirmative), the value for the attribute named "ref" is acquired (step 51) and the reference ID for the element with the id value matching the "ref" value is returned (step 53).

Referring to the code 46 of FIG. 5b, when getSoleChild finds that the element is not a reference, i.e., getSoleChild returns null, then resultString, initialized as null, is returned as null. When the code 46 finds that the element is a reference, (i.e., getSoleChild returns non-null), then the getAttribute command of the second function 46 finds the link and gets the attribute "ref" value from the link. By way of the example of FIG. 3, the second function would determine that group element 18 was an element that is a reference to another element, i.e., is a link, and would return the resultString with the id attribute, group_some_authors, of the actual element being referred to by the 'ref' attribute of the link.

A third function extends the first and second functions by resolving an element, so that through a single call of the third function, it is not necessary to have other programming be concerned about links and references. The third function builds upon the first and second functions and with the use of parser function, getElementByID, returns an element with an attribute of type ID and the given value as a result element.

Referring to FIG. 6a, the functionality initiates by determining whether a given element has a sole child with a tag name "Link" (step 45). If the answer is negative, the given element is returned (step 55). If the answer is positive, the value for the attribute named "ref" is acquired (step 51). Then, the element is acquired that has an attribute of type "ID" whose value equals the value obtained in step 51 (step 57). The tag name of the element acquired in step 57 is then checked by determining whether its tag name matches the tag name of the given element having the sole child (step 59). If the tag names match, the element acquired in step 57 is returned (step 61). If there is not a match between the tag names, a fail condition exists and the element is not resolved (step 63).

The code 48 of FIG. 6b corresponds to the process of FIG. 6a. The determination of whether there is a link occurs through the getSoleChild command. When there is a link, the getAttribute command then finds the link and gets the attribute "ref" value, and getElementbyID returns the element from the tree that has a matching id attribute to the ref value returned by the getAttribute command. For the example of FIG. 3, function 48 would determine that there is a link element, group 18, whose ref is group_some_authors, and would return the element with that id, group element 12, as the resultElement.

The code 48 further illustrates the use of the getTagName and IllegalArgumentException commands to ensure that the tag name of its result element matches the tag name of the link element found (step 59, FIG. 6a). Thus, for the example of FIG. 3, this check in function 48 ensures that element 18 and element 12 have the same tag name, i.e., both are groups. If there is a mismatch between tag names, an exception is thrown.

Figures 7A, 7B, 8:
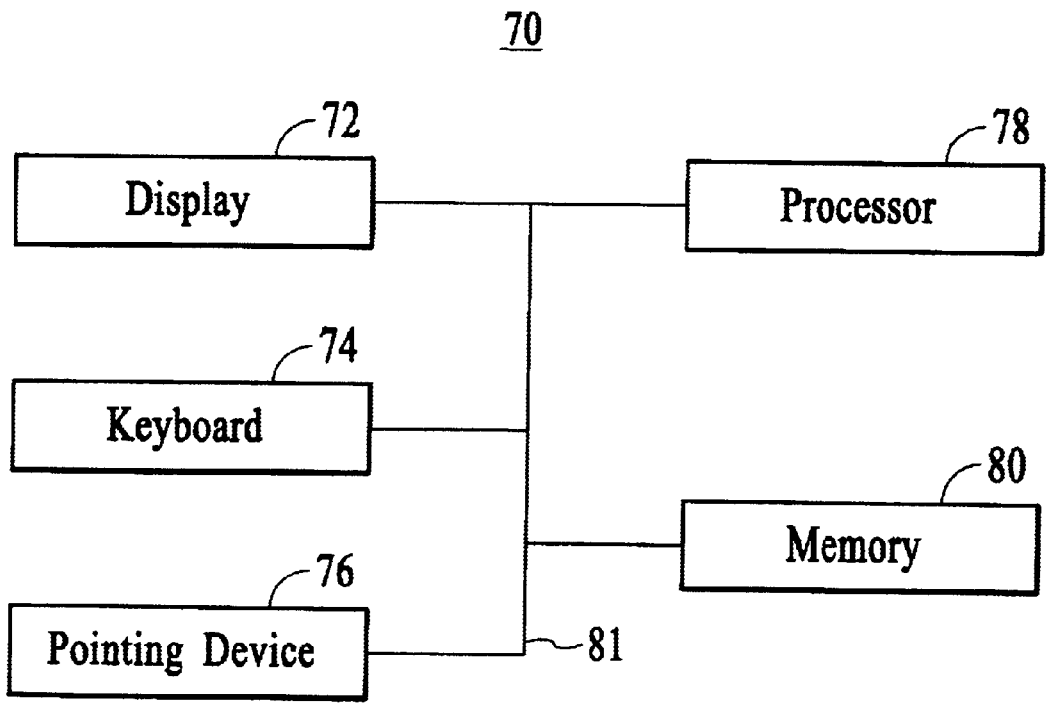
FIG. 7a illustrates an example of a DTD.
FIG. 7b illustrates an example of an augmented DTD in accordance with a preferred embodiment of the present invention.
FIG. 8 illustrates a block diagram of a computer processing system for implementing the present invention.

While the aspects of the present invention have been described with reference to an example situation of users and groups, FIGS. 7a and 7b illustrate a more generic representation of DTD augmentation in accordance with the present invention. FIG. 7a provides a traditional manner of representing an element A1 with a child element A2 in a DTD 66. As shown in DTD 66, the element A1 must contain an element A2, and element A2 is empty.

Referring to FIG. 7b, provision for the use of the Link element in accordance with the present invention is illustrated in an example DTD 68. Under the constraints of DTD 68, an element A1 must contain an element A2 or an element Link. A1 has an attribute id of type ID whose value is optionally specified. Element A2 is still empty. Element Link is empty and has one attribute "ref" of type IDREF in accordance with the standard XML specification that is required, i.e., the text inside the value of the attribute named "ref" of the element Link has to appear exactly once elsewhere in the file inside the value of another attribute that is type ID, i.e., the attribute named "rd" of the element A1.

In implementation, at its first location (in lexical order) in the XML file, the element A1 contains its child elements, e.g., element A2, and a special attribute named "id" of type ID. At subsequent locations (also in lexical order), the element A1 does not contain its child elements. Rather, each subsequent time A1 appears, the single element Link is used with the attribute "ref" that corresponds to the id attribute of the element A1.

The aspects of the present invention are suitably implemented in a computer processing system, such as represented in the block diagram of FIG. 8. The computer system 70, such as a personal computer (PC) system, includes a display 72, a keyboard 74, a pointing device 76, a processor 78, and memory 80, which are all connected by a bus 81. The processor 78 operates in accordance with an operating system in conjunction with memory 80 to execute operations, such as those described hereinabove. Of course, the functions described herein for controlling the operations of the computer system 70 may be provided via any desired and appropriate computer readable medium, such as a floppy disk, hard disk drive, etc., as is well understood by those skilled in the art.

Through the aspects of the present invention disclosed herein, a more human-oriented way of specifying data relationships within the hierarchical structure of XML is achieved. The data specification allows an element to be specified once initially but subsequently linked to the initial specification. Further, the present invention provides the functions necessary to properly process the new data definitions in a seamless and straightforward manner.

The present invention has been described in accordance with the embodiments shown, and one of ordinary skill in the art will readily recognize that there could be variations to the embodiments, and any variations are would be within the spirit and scope of the present invention. Accordingly, many modifications may be made by one of ordinary skill in the art without departing from the spirit and scope of the appended claims.

What is claimed is:

1. A method for achieving directed acyclic graph (DAG) representations of data in XML, the method comprising:

defining an element in a first location of an XML file with a special attribute, including defining a link element that refers to the special attribute, defining a reference attribute of the link element of type IDREF in accordance with a specification for XML to refer to the special attribute, and defining the special attribute as an id attribute of type ID in accordance with the specification for XML; and defining the element at one or more second locations in the XML file by referring to the special attribute, wherein the first location comprises a location in lexical order of the XML file before the one or more second locations.

2. The method of claim 1 further comprising processing the XML file to determine whether one element is a reference to another element.

3. The method of claim 1 further comprising processing the XML file to determine whether one element is a reference to another element and to return the special attribute when the one element is a reference to another element.

4. The method of claim 1 further comprising processing the XML file to resolve each element which may be a reference to another element.

5. The method of claim 4 wherein processing the XML file to resolve each element further comprises processing the XML file to determine whether one element in the XML file is a reference to another element, to return the special attribute when the one element is a reference to another element, and to parse the one element to get the another element as a result element.

6. A method for achieving directed acyclic graph (DAG) representations of data in XML, the method comprising:

defining an element in a first location of an XML file with a special attribute;

defining the element at one or more second locations in the XML file by referring to the special attribute;

processing the XML file to resolve each element which may be a reference to another element, including processing the XML file to determine whether one element in the XML file is a reference to another element, to return the special attribute when the one element is a reference to another element, and to parse the one element to get the another element as a result element; and ensuring that the one element and the another element have matching tag names.

7. A method for achieving directed acyclic graph (DAG) representations of data in XML, the method comprising:

augmenting a document type definition (DTD) for allowing description of the DAG in an XML file, including adding an element with a link tag name that has a reference attribute of type IDREF in accordance with a specification for XML;

defining an element in a first location in the XML file with at least one child element and a special attribute, and defining the special attribute as an id attribute of type ID in accordance with the specification for XML;

defining an element in one or more second locations by defining a link element that refers to the special attribute; and providing functionality for a document object model application program interface (DOM API) to process the XML file, including providing functionality to determine whether one element in the XML file is a reference to another element, to return the special attribute when the one element is a reference to another element, and to resolve each element which may be a reference to another element.

8. A system that achieves directed acyclic graph (DAG) representations of data in XML, the system comprising:

a computer processing system providing a data model that represents data as a directed acyclic graph (DAG); and computer readable medium utilized by the computer processing system, the computer readable medium containing program instructions for augmenting a document type definition (DTD) for allowing description of the DAG in an XML file, including adding an element with a link tag name that has a reference attribute of type IDREF in accordance with a specification for XML, for defining an element in a first location in the XML file with at least one child element and a special attribute, including defining the special attribute as an id attribute of type ID in accordance with the specification for XML, and defining the element at one or more second locations by referring to the special attribute, including defining a link element that refers to the special attribute, wherein the first location comprises a location in lexical order of the XML file before the one or more second locations, and for providing functionality for a document object model application program interface (DOM API) to process the XML file.

9. The system of claim 8 wherein providing functionality further comprises providing functionality to process the XML file to determine whether one element in the XML file is a reference to another element.

10. The system of claim 8 wherein providing functionality further comprises providing functionality to determine whether one element in the XML file is a reference to another element and to return the special attribute when the one element is a reference to another element.

11. The system of claim 8 wherein providing functionality further comprises providing functionality to determine whether one element in the XML file is a reference to another element, and to return the special attribute when the one element is a reference to another element, and to resolve each element which may be a reference to another element.

12. A system that achieves directed acyclic graph (DAG) representations of data in XML, the system comprising:

a computer processing system providing a data model that represents data as a directed acyclic graph (DAG); and computer readable medium utilized by the computer processing system, the computer readable medium containing program instructions for augmenting a document type definition (DTD) for allowing description of the DAG in an XML file, including adding an element with a link tag name that has a reference attribute of type IDREF in accordance with a specification for XML and for providing functionality for a document object model application program interface (DOM API) to process the XML file, including providing functionality to determine whether one element in the XML file is a reference to another element, to return the special attribute when the one element is a reference to another element, and to resolve each element which may be a reference to another element, and ensuring that the one element and the another element have matching tag names.

* * * * *